L. LEWIS.

Improvement in Animal Traps.

No. 123,633.                                      Patented Feb. 13, 1872.

Witnesses
P. C. Dieterich
Geo. W. Mabee

Inventor:
Lawrence Lewis
per
Attorneys.

123,633

UNITED STATES PATENT OFFICE.

LAWRENCE LEWIS, OF TUSKEGEE, ALABAMA.

IMPROVEMENT IN ANIMAL-TRAPS.

Specification forming part of Letters Patent No. 123,633, dated February 13, 1872.

Specification describing a new and Improved Animal-Trap, invented by LAWRENCE LEWIS, of Tuskegee, in the county of Macon and State of Alabama.

Figure 1:
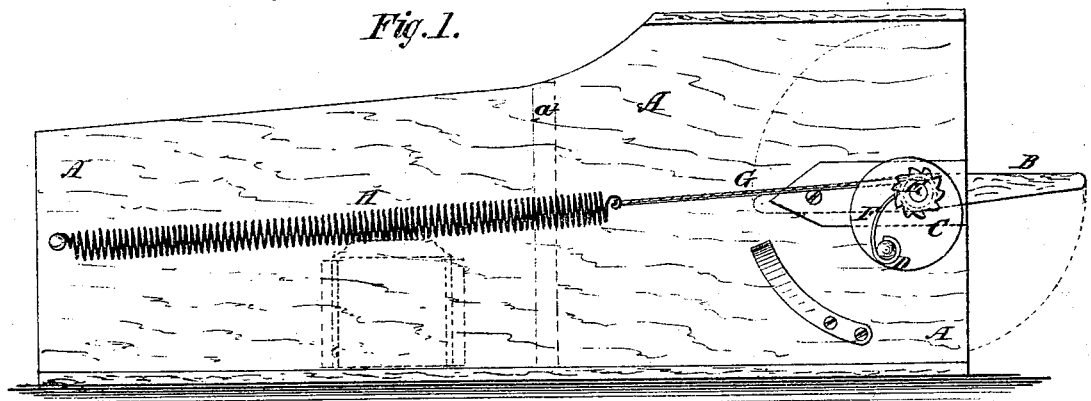
Figure 2:
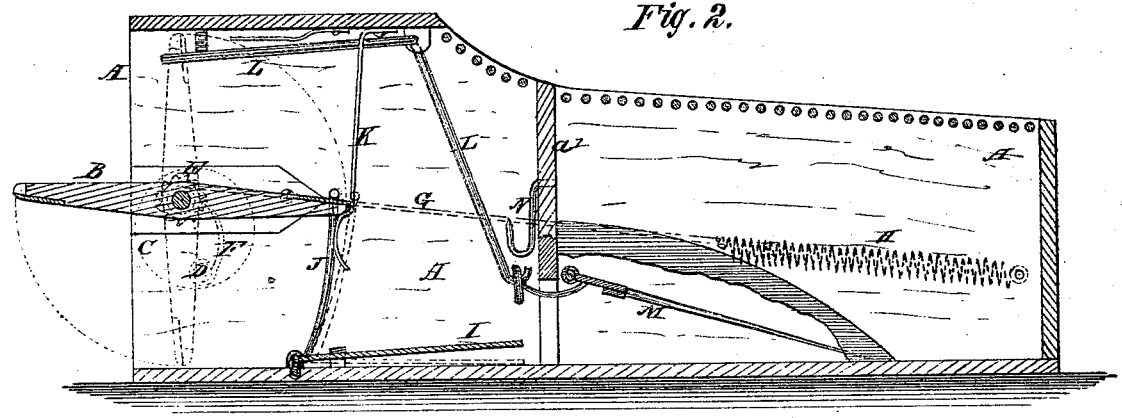
Figure 3:
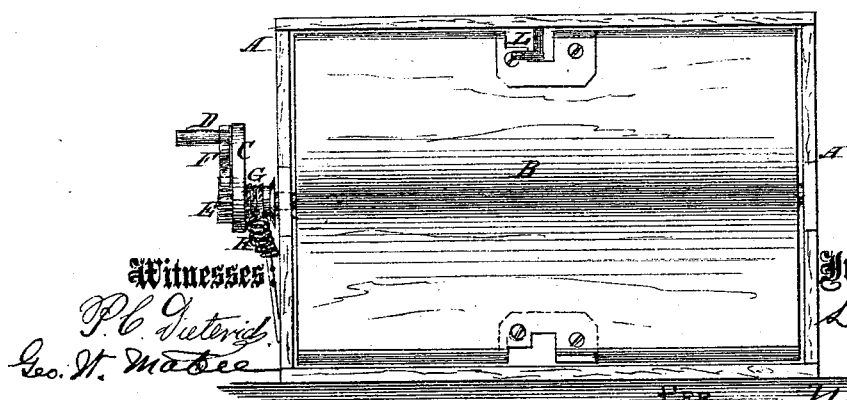

Figure 1 is a side view of my improved trap. Fig. 2 is a detail longitudinal section of the same. Fig. 3 is an end view of the same, the door being shown closed.

Similar letters of reference indicate corresponding parts.

My invention has for its object to furnish an improved trap for catching rats, mice, and other animals, which shall be simple in construction, convenient in use, not liable to get out of order, and effective and reliable in operation; and it consists in the construction and combination of the various parts of the trap, as hereinafter more fully described.

A is the box of the trap, the two sides and one end of which are made close, except a hole in one of said sides for convenience in taking out the caught animals, which hole is closed with a sliding door, as shown in Fig. 1. The box A is divided into two compartments by a partition, $a'$, as shown in Figs. 1 and 2. The forward part of the top of the trap is covered with a close cover, but the rest of the top of the trap is formed of slats or grating to let in the light. The open end of the box A is closed with a door, B, which is pivoted at the centers of its side edges to the sides of the box A. One of the pivots of the door B projects upon the outer side of the box A, and has a spool, C, placed upon it. The spool C has a crank, D, attached to its outer end, and is connected with the pivot upon which it is placed by a ratchet-wheel, E, and spring-pawl F, as shown in Fig. 1, so that it may be turned in one direction to wind up the cord G and extend the coiled spring H without turning the door B, but cannot be turned in the other direction without carrying the door B with it. One end of the cord G is attached to the spool C, and its other end attached to one end of the coiled spring H, the other end of which is secured to the side of the box A near its closed end, as shown in Fig. 1. I is a platform, which is hinged at its forward end to the bottom of the box A in such a way that when left free its free or rear end will raise a little from the floor of the box A, as shown in Fig. 2. The free end of the platform I may be held up, if desired, by a spring placed beneath or otherwise connected with it. To the forward part of the platform I is rigidly attached an arm, J, having a hook or catch formed upon its upper end to catch upon the notched edge of the door B and hold it open or set. K is a spring-catch attached to the top of the box A, and projected down into such a position as to support the edge of the door B and prevent said edge from moving downward, the catch J preventing it from moving upward. L is a bent or double crank-lever pivoted to the top of the box A. Upon the end of the forward arm of the lever L is formed a catch to receive and hold the edge of the door B when in a vertical position or closed. The other end of the lever L projects downward, and is connected with an arm attached to the pivoted or upper end of the small drop-door M that closes the passage-way leading through the partition $a'$ from the front to the rear compartment of the box A. N is the bait-hook, which is attached to the partition $a'$ directly above the raised or inner end of the platform I.

The trap, when set, is arranged as shown in Fig. 2.

With this construction the animal, in trying to reach the bait, steps upon the platform I, which withdraws the catch J from the door B and allows the said door to be revolved, through a quarter of a revolution, into a vertical position, when its upper edge is caught and held by the catch L.

The slam of the door B frightens the animal, which, seeking to escape, rushes through the passage-way leading into the rear compartment, raising the door M in his passage, which movement of the door M operates the lever L, releases the door B, and allows it to be revolved into a horizontal position, again setting the trap.

Having thus described my invention, I claim as new and desire to secure by Letters Patent—

The combination of the spool C, ratchet-wheel E, spring-pawl F, cord G, coiled spring H, spring-platform I, catch-arm J, catch K, and catch-lever L with each other and with the pivoted door B, drop-door M, and box A $a'$, substantially as herein shown and described, and for the purpose set forth.

LAWRENCE LEWIS.

Witnesses:
  W. C. DANNER,
  P. S. LOCKARD.